United States Patent
Joko (10) Patent No.: US 8,989,030 B2
(45) Date of Patent: Mar. 24, 2015

(54) THRESHOLD VALUE CALCULATION METHOD AND RADIO BASE STATION

(75) Inventor: Shingo Joko, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 578 days.

(21) Appl. No.: 13/380,466

(22) PCT Filed: Jun. 25, 2010

(86) PCT No.: PCT/JP2010/060909
§ 371 (c)(1),
(2), (4) Date: Mar. 19, 2012

(87) PCT Pub. No.: WO2010/150897
PCT Pub. Date: Dec. 29, 2010

(65) Prior Publication Data
US 2012/0099472 A1    Apr. 26, 2012

(30) Foreign Application Priority Data

Jun. 25, 2009 (JP) ................. 2009-151655

(51) Int. Cl.
*G01R 31/08* (2006.01)
*H04L 1/00* (2006.01)

(52) U.S. Cl.
CPC .................. *H04L 1/0021* (2013.01)
USPC ............ 370/252; 370/328; 375/260

(58) Field of Classification Search
CPC ........................................ H04B 1/38
USPC .................. 370/312, 252–253, 328–339; 375/260–340

See application file for complete search history.

(56) References Cited

U.S. PATENT DOCUMENTS

| | | | |
|---|---|---|---|
| 7,231,183 B2 * | 6/2007 | Pauli et al. | 455/67.11 |
| 2005/0128976 A1 | 6/2005 | Uehara et al. | |
| 2005/0169391 A1 * | 8/2005 | Takeda et al. | 375/259 |
| 2010/0128622 A1 * | 5/2010 | Horiuchi et al. | 370/252 |

FOREIGN PATENT DOCUMENTS

| | | |
|---|---|---|
| JP | 2006-211017 A | 8/2006 |
| WO | 2003/067916 A1 | 8/2003 |
| WO | 2008/032580 A1 | 3/2008 |

OTHER PUBLICATIONS

International Search Report; PCT/JP2010/060909; Jul. 20, 2010.
3rd Generation Partnership Project; Technical Specification Group Radio Access Network; Feasibility Study for OFDM for UTRAN enhancement; (Release 6); #GPP TR 25.892 V1.1.0 (Mar. 2004).

* cited by examiner

*Primary Examiner* — Iqbal Zaidi
(74) *Attorney, Agent, or Firm* — Studebaker & Brackett PC (57) ABSTRACT

A threshold calculation apparatus (200) corrects each of ideal E-SINR thresholds in an MCS threshold table in accordance with a reduction in accuracy of the E-SINR due to the use of a first transformation table and a second transformation table, and generates a corrected MCS threshold table. In the case where a wireless base station obtains an E-SINR from a plurality of SINRs using the first transformation table and the second transformation table, the wireless base station determines an MCS corresponding to the E-SINR also based on the corrected MCS threshold table.

5 Claims, 10 Drawing Sheets

| MCS | 0 | 1 | 2 | 3 | 4 | 5 | ~ | 28 |
|---|---|---|---|---|---|---|---|---|
| E-SINR (dB) | -5 | -4.01863 | -3.16552 | -2.20765 | -1.42152 | -0.48237 | ~ | 26.17972 |

FIG. 7

| SINR(dB) | EESM |
|---|---|
| -1.5 | 0.63282 |
| -1.49 | 0.632153 |
| -1.48 | 0.631485 |
| -1.47 | 0.630816 |
| -1.46 | 0.630147 |
| -1.45 | 0.629476 |
| -1.44 | 0.628805 |
| -1.43 | 0.628133 |
| -1.42 | 0.62746 |
| -1.41 | 0.626786 |
| -1.4 | 0.626111 |
| -1.39 | 0.625436 |
| -1.38 | 0.62476 |
| -1.37 | 0.624083 |
| -1.36 | 0.623405 |
| -1.35 | 0.622726 |
| -1.34 | 0.622046 |
| -1.33 | 0.621366 |
| -1.32 | 0.620685 |
| -1.31 | 0.620003 |
| -1.3 | 0.61932 |

FIG. 8

| EESM- | E-SINR(dB) |
|---|---|
| 0.62 | -1.30996 |
| 0.621 | -1.32463 |
| 0.622 | -1.33932 |
| 0.623 | -1.35404 |
| 0.624 | -1.36878 |
| 0.625 | -1.38355 |
| 0.626 | -1.39835 |
| 0.627 | -1.41317 |
| 0.628 | -1.42803 |
| 0.629 | -1.4429 |
| 0.63 | -1.45781 |
| 0.631 | -1.47274 |
| 0.632 | -1.48771 |
| 0.633 | -1.5027 |
| 0.634 | -1.51771 |
| 0.635 | -1.53276 |
| 0.636 | -1.54783 |
| 0.637 | -1.56294 |
| 0.638 | -1.57807 |
| 0.639 | -1.59323 |
| 0.64 | -1.60842 |

| MCS | 0 | 1 | 2 | 3 | 4 | 5 | ~ | 28 |
|---|---|---|---|---|---|---|---|---|
| E-SINR (dB) | -4.9962 | -4.01905 | -3.16337 | -2.20945 | -1.42803 | -0.48503 | ~ | 26.17005 |

THRESHOLD VALUE CALCULATION METHOD AND RADIO BASE STATION

TECHNICAL FIELD

The present invention relates to a threshold value calculation method used in a threshold value calculation apparatus configured to calculate a threshold value of a communication quality used when determining MCS (Modulation and Coding Scheme) corresponding to a communication quality of a radio resource in a radio base station, and a radio base station configured to determine MCS corresponding to a communication quality of a radio resource.

BACKGROUND ART

In an LTE (Long Term Evolution) radio communication system that is currently being standardized in relation to the 3GPP (Third Generation Partnership Project), OFDMA (Orthogonal Frequency Division Multiple Access) is applied to the downlink communication from a radio base station to a radio terminal.

In an LTE radio communication system, a two-dimensional scheduler is used in scheduling by assignment of radio resources that are divided by a time direction and a frequency direction to radio terminals so that a radio base station can manage a plurality of radio terminals and make effective use of radio resources. The use of a two-dimensional scheduler by the radio base station enables the assignment of radio resources having different frequencies to respective radio terminals during time-direction scheduling. In this manner, more efficient transmission is enabled in response to frequency variation or time variation in the wireless environment.

When executing scheduling by use of the above two-dimensional scheduler, the radio base station must comprehend the communication quality with the radio terminal. In an LTE radio communication system, the radio base station enables recognition of the downlink communication quality by use of CQI (Channel Quality Indicator) from the radio terminal.

CQI corresponds to MCS (Modulation and Coding Scheme) that is uniquely determined by the modulation scheme and the transmission block size. Further, an LTE radio communication system is specified so that the FER (Frame Error Rate) does not exceed 10%. Therefore, the SINR (Signal to Interference and Noise Power Ratio) that satisfies the condition that the FER is 10% in MCS corresponding to the CQI from the radio terminal may be deemed to be the minimum downlink SINR in the MCS.

SINR that satisfies the condition that the FER is 10% in a predetermined MCS enables advance calculation by use of a computer simulation, or the like. The calculated value may be used as a threshold value when the radio base station selects MCS of a downlink radio resource based on the SINR corresponding to the CQI from a radio terminal.

In an LTE radio communication system, S-CQI (Subband CQI) being the CQI of each subband is used in assigning a frequency-direction radio resource. When a radio base station assigns a plurality of subbands to a predetermined radio terminal, E-SINR (effective SINR) is used to determine the MCS for the radio terminal. E-SINR is a value that combines the SINR corresponding to the S-CQI of each subband assigned to the radio terminal.

A combining scheme of obtaining E-SINR includes a scheme termed EESM (Exponential Effective SIR Mapping) (see Non-Patent Literature 1, for example). In an EESM scheme, the true value of SINR corresponding to S-CQI for each subband assigned to the radio terminal is converted to EESM using an exponential function (Equation 1) EESM=Exp ($-SINR/\beta$). As used herein, $\beta$ is a value termed an EESM coefficient. Further, the value EESM$^-$ that is the EESM average value is converted to E-SINR by a logarithmic function (Equation 2) E-SINR=$-\beta*\log(EESM^-)$ that is an inverse operation of the above exponential function.

E-SINR is compared with the threshold value for E-SINR that satisfies the condition that FER is 10% to thereby determine MCS that satisfies the condition that FER is 10%.

CITATION LIST

Non-Patent Literature

Non-Patent Literature 1: [online], [searched on Jun. 10, 2009], <URL:http://www.3gpp.org/ftp/Specs/archive/25_series/25.892/25892-1 10.zip>

SUMMARY OF THE INVENTION

When scheduling by use of the above two-dimensional scheduler, the assignment interval for radio resources in a time direction is 1 [msec] representing one subframe time period. Therefore, the radio base station may complete the assignment of one subframe within 1 [msec].

However, a so-called 3.9th generation radio communication system such as LTE uses a scheduling method termed Proportional Fair in order to ensure a balance between radio terminals. Since scheduling in a time direction and frequency direction is also executed in Proportional Fair, the processing amount in the radio base station is increased in comparison to the previous Round Robin method that is a scheduling method only executed in a time direction. Further, when taking QoS in account for example, the scheduler is sophisticated, and the processing amount in the radio base station is further increased.

It has been proposed to deal with the increase in the processing amount by (1) providing a high processing-speed CPU, DSP or the like in the radio base station, (2) reviewing the scheduling algorithm, or (3) reducing the precision of the calculation processing. With respect to these proposals, (1) increases costs, (2) increases the development period, and (3) increases the development costs.

Further, when the precision of the calculation processing is reduced in (3), it has been proposed to provide a table in advance for conversion of SINR to EESM and a table for conversion of EESM$^-$ to E-SINR instead of the above description in which the calculation for SINR is converted to EESM using the exponential function (Equation 1), and in which the calculation for EESM$^-$ is converted to E-SINR using a logarithmic function (Equation 2). However, since the values used in the tables are discrete values, there is a reduction in precision in comparison with a calculation using floats. This reduction in the precision of the calculation processing may result in determination of MCS that is different from the MCS that should be selected when the MCS is determined based on E-SINR. As a result, there is the possibility of a reduction in throughput.

In view of the above-described problems, an object of the present invention is to provide a threshold value calculation method and a radio base station, by which it is possible to determine a suitable MCS according to a communication quality while reducing a processing load on the radio base station.

To solve the above problem, the present invention has following features. A first feature of the present invention is summarized as a threshold value calculation method in a threshold value calculation apparatus configured to calculate a threshold value of a communication quality used when determining MCS (Modulation and Coding Scheme) corresponding to a communication quality of a radio resource in a radio base station, comprising the steps of: the threshold value calculation apparatus (exponential function conversion unit 212) converting a first threshold value that is an ideal value into a first calculation value by using a first table indicating a correspondence relationship between a first value indicating a communication quality and a second value obtained by a calculation using a first function for the first value; and the threshold value calculation apparatus (logarithmic function conversion unit 214) converting the first calculation value into a corrected threshold value by using a second table indicating a correspondence relationship between a third value indicating a communication quality and a fourth value obtained by an arithmetic operation using a second function that is an inverse operation of the calculation using the first function in relation to the third value.

In such a threshold value calculation method, the first threshold value that is an ideal value is converted by using the first table and the second table, and the finally obtained value is used as a corrected threshold value. When the radio base station acquires a communication quality for determining MCS by converting the communication quality by using the first table and the second table, the processing amount in the radio base station decrease; however, the communication quality for determining MCS, obtained by the conversion, experiences a precision deterioration. However, the threshold value is corrected according to the precision deterioration, and thus, when the communication quality for determining MCS and the threshold value are compared, the radio base station enables to determine the appropriate MCS that complies with the communication quality.

A second feature of the present invention according to the first feature of the present invention is summarized as that the threshold value calculation method includes the steps of: the threshold value calculation apparatus holding a corrected table indicating a correspondence relationship between the MCS and the corrected threshold value.

A third feature of the present invention according to the first feature or the second feature of the present invention is summarized as that the first function is an exponential function, and the second function is a logarithmic function.

A fourth feature of the present invention is summarized as a radio base station configured to determine MCS (Modulation and Coding Scheme) corresponding to a communication quality of a radio resource, comprising: a first conversion unit configured to convert a first threshold value that is an ideal value of a threshold value of the communication quality used when determining MCS corresponding to a communication quality of the radio resource into the first calculation value, by using a first table indicating a correspondence relationship between a first value indicating a communication quality and a second value obtained by a calculation using a first function for the first value; and a second conversion unit configured to convert the first calculation value into a corrected threshold value by using a second table indicating a correspondence relationship between a third value indicating a communication quality and a fourth value obtained by a calculation using a second function that is an inverse operation of the calculation using the first function for the third value.

A fifth feature of the present invention according to the fourth feature of the present invention is summarized as that the radio base station includes a holding unit configured to hold a corrected table indicating a correspondence relationship between the communication quality and the corrected threshold value.

According to the present invention, a suitable MCS in response to the communication quality can be determined while reducing the processing amount in the radio base station.

BEST MODES FOR CARRYING OUT THE INVENTION

Next, an embodiment of the present invention will be described with reference to the drawings. More specifically, (1) Configuration of Radio Communication System, (2) Operation of Radio Base Station, (3) Operation and Effect, and (4) Other Embodiments will be described. The disclosure of the drawings in relation to the following embodiments uses the same or similar reference numerals in relation to the same or similar portion.

Figure 1:
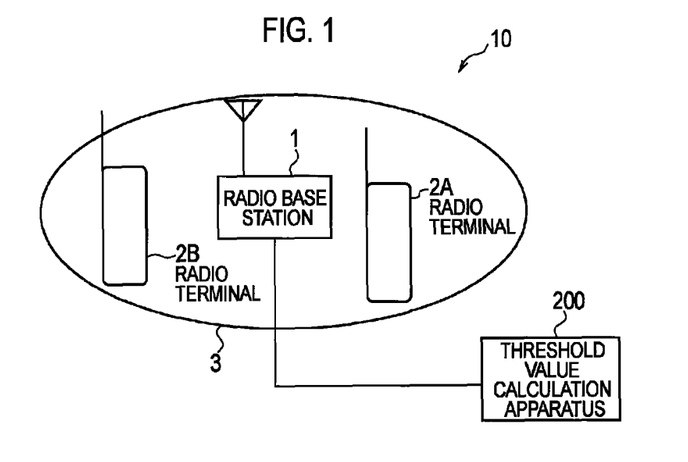
FIG. 1 is a schematic diagram illustrating the entire configuration of a radio communication system according to an embodiment of the present invention.

(1) Configuration of Radio Communication System
(1.1) Overall Schematic Configuration of Radio Communication System FIG. 1 is a schematic diagram showing the entire configuration of a radio communication system 10 according to an embodiment of the present invention.

The radio communication system 10 illustrated in FIG. 1 has a configuration based on LTE (Long Term Evolution) standardized with reference to 3GPP. The radio communication system 10 includes a radio base station 1, a radio terminal 2A, a radio terminal 2B, and a threshold value calculation apparatus 200. In FIG. 1, the radio terminal 2A and the radio terminal 2B are present within a cell 3 provided by the radio base station 1. The radio base station 1 assigns the radio terminal 2A and the radio terminal 2B that are provided in the cell 3 with a subband, that is one or a plurality of frequency bands, as a downlink radio resource (the direction from the radio base station 1 to the radio terminal 2A and the radio terminal 2B). Further, the radio base station 1 executes communication with the radio terminal 2A and the radio terminal 2B that are provided in the cell 3. The threshold value calculation apparatus 200 calculates a threshold value for communication quality used when determining MCS corresponding to a communication quality (S-CQI) of the subband in the radio base station 1.

Figure 2:
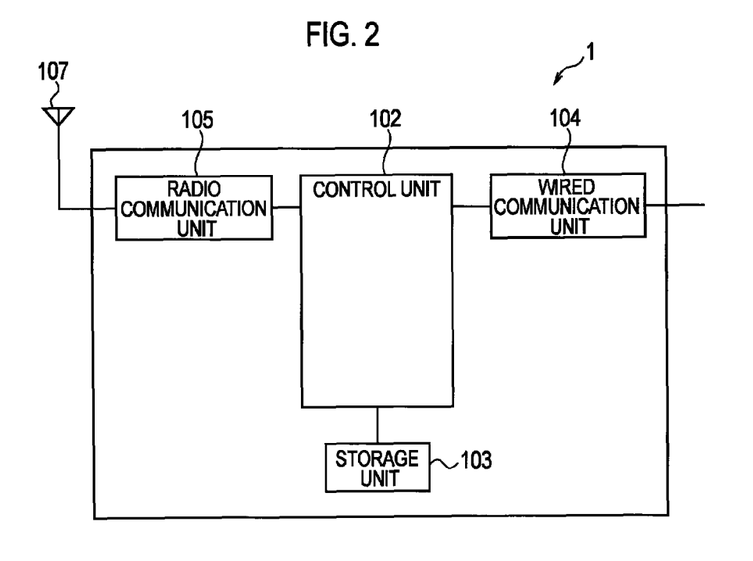
FIG. 2 is a diagram illustrating the configuration of a radio base station according to the embodiment of the present invention.

(1.2) Configuration of Radio Base Station and Threshold Value Calculation Apparatus FIG. 2 is a diagram illustrating the configuration of the radio base station 1. The radio base station 1 illustrated in FIG. 2 includes a control unit 102, a storage unit 103, a wired communication unit 104, a radio communication unit 105, and an antenna 107.

The control unit 102 is configured, for example, by a CPU, and controls each function provided in the radio base station 1. The storage unit 103 is configured, for example, by a memory, and stores various types of information used in control for the like in the radio base station 1. The wired communication unit 104 is connected to an access gateway or the like provided on an upper network via a router or the like (not shown). The radio communication unit 105 receives a radio signal via the antenna 107 from the radio terminal 2A and the radio terminal 2B and transmits a radio signal to the radio terminal 2A and the radio terminal 2B.

Figure 3:
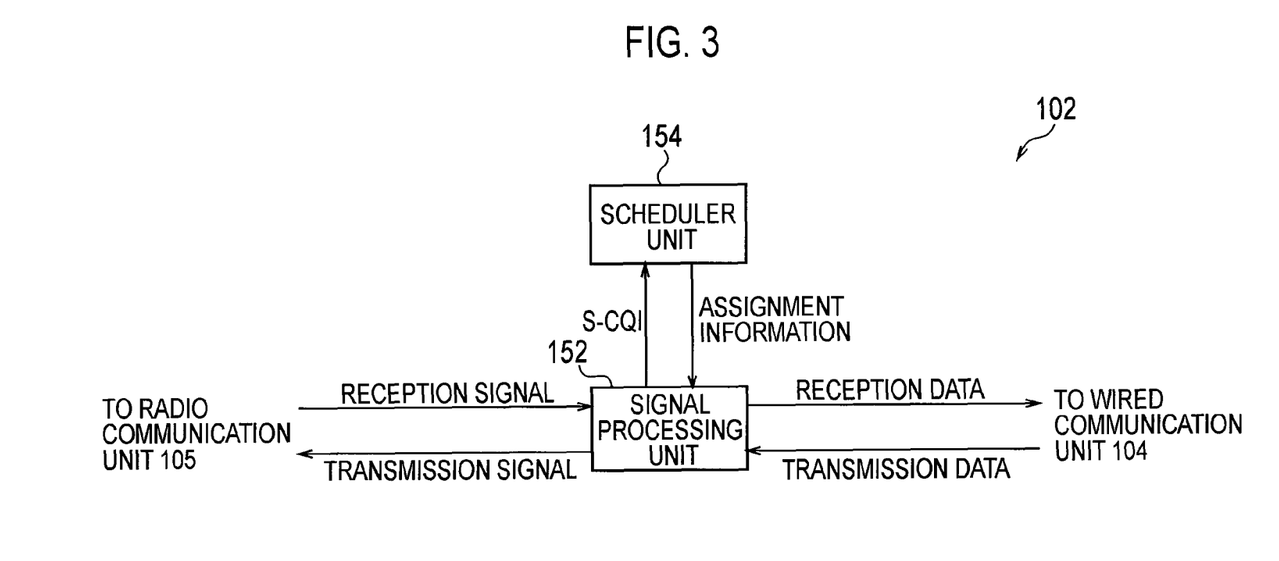
FIG. 3 is a diagram illustrating the configuration of a control unit according to the embodiment of the present invention.

FIG. 3 is a diagram illustrating the configuration of the control unit 102. As illustrated in FIG. 3, the control unit 102 includes a signal processing unit 152 and a scheduler unit 154.

The signal processing unit 152 inputs data transmitted from the upper network (transmission data) via the wired communication unit 104. Further, the signal processing unit 152 executes encryption, modulation and the like in relation to transmission data to thereby produce a transmission signal. In addition, the signal processing unit 152 transmits the transmission signal via the radio communication unit 105 and the antenna 107 to the radio terminal 2A and the radio terminal 2B.

The signal processing unit 152 inputs the signal (reception signal) transmitted from the radio terminal 2A and the radio terminal 2B via the antenna 107 and the radio communication unit 105. Further, the signal processing unit 152 executes demodulation and decryption, and the like on the reception signal, to thereby produce data (reception data). Then the signal processing unit 152 transmits the reception data to the upper network via the wired communication unit 104.

When communication is executed by assignment to the radio terminal 2A and the radio terminal 2B of a subband that is a downlink radio resource (the direction from the radio base station 1 to the radio terminal 2A and the radio terminal 2B), the radio base station 1 determines the MCS of the subband. In this case, the following processing is executed.

The radio terminal 2A and the radio terminal 2B transmit a radio signal including S-CQI indicating the communication quality of the subband. The signal processing unit 152 extracts S-CQI indicating the communication quality of the subband that is contained in the reception data. The S-CQI includes identification information for the corresponding subband and a terminal ID that is identification information for the radio terminal 2 of the transmission source. Further, the signal processing unit 152 outputs the extracted S-CQI to the scheduler unit 154.

Figure 4:
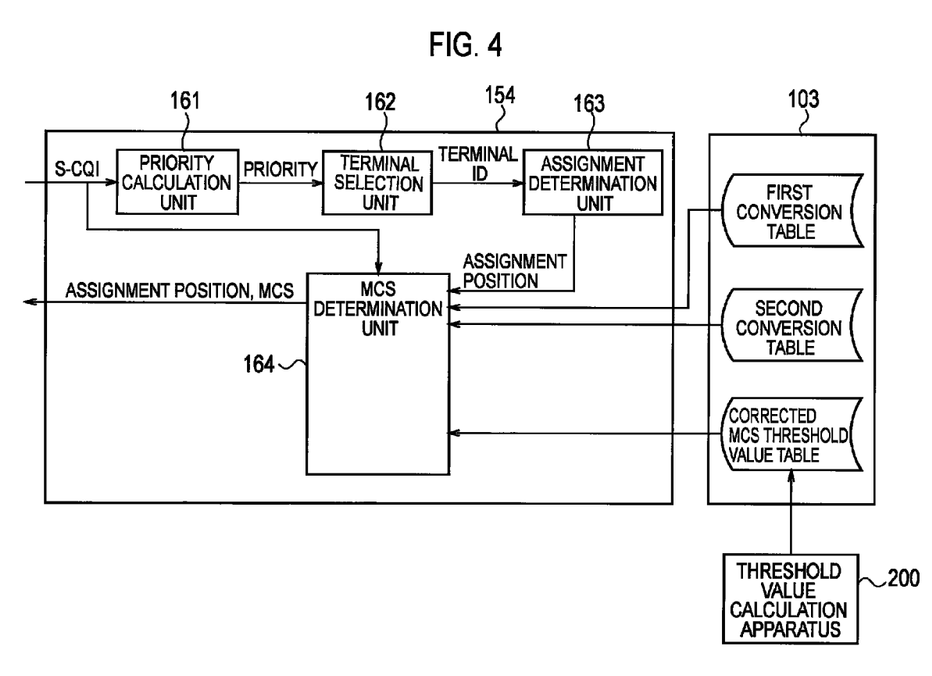
FIG. 4 is a diagram illustrating the configuration of a scheduler unit according to the embodiment of the present invention.

FIG. 4 is a diagram illustrating the configuration of the scheduler unit 154. The scheduler unit 154 illustrated in FIG. 4 includes a priority calculation unit 161, a terminal selection unit 162, an assignment determination unit 163, and an MCS determination unit 164.

The priority calculation unit 161 inputs the S-CQI from the signal processing unit 152. Then the priority calculation unit 161 calculates the priority of the subband assignment in relation to the radio terminal of the transmission source of the S-CQI at a predetermined timing. For example, the number of subbands that have been assigned to the radio terminal is stored in the storage unit 103 for each radio terminal. When the S-CQI is input from the radio terminal 2A and the radio terminal 2B, the priority calculation unit 161 uses the number of assigned subbands stored in the storage unit 103 to thereby increase the priority of subband assignment to a radio terminal that has a low number of assigned subbands, and reduce the priority of the subband assignment to a radio terminal that has a high number of assigned subbands.

The priority calculation unit 161 outputs the assignment priority for subbands calculated for each radio terminal together with the terminal ID of the radio terminal to the terminal selection unit 162.

The terminal selection unit 162 inputs the assignment priority and the terminal ID of the subband for each radio terminal. Then, the terminal selection unit 162 selects the next radio terminal for assignment of the subband based on the priority for subband assignment for each radio terminal at a predetermined timing. The terminal selection unit 162 outputs the terminal ID of the next radio terminal selected for assignment of a subband to an assignment determination unit 163.

The assignment determination unit 163 inputs the terminal ID of the next radio terminal for assignment of the subband. Then the assignment determination unit 163 determines the subband to be assigned to the radio terminal corresponding to the inputted terminal ID. For example, the storage unit 103 stores assignment condition information in relation to each subband including an assignment condition that indicates identification information for a subband and whether or not a subband is assigned. The assignment determination unit 163 selects an unassigned subband based on the assignment condition information. Further, the assignment determination unit 163 outputs the identification information for a plurality of unassigned subbands as information (assignment position) in relation to a plurality of subbands to be assigned to a radio terminal together with the terminal ID of the radio terminal, to the MCS determination unit 164.

The MCS determination unit 164 inputs the S-CQI from the signal processing unit 152. Then the MCS determination unit 164 inputs the plurality of assignment positions and the terminal ID from the assignment determination unit 163. The MCS determination unit 164 determines the MCS of the plurality of subbands assigned to the radio terminal corresponding to the terminal ID based on the S-CQI from the signal processing unit 152, the plurality of assignment positions and terminal IDs from the assignment determination unit 163, and a corrected threshold value table, a first conversion table, and second conversion table described below that are stored in the storage unit 103. A specific method of determining MCS will be described below.

The corrected MCS threshold value table is produced by the threshold value calculation apparatus 200.

Figure 5:
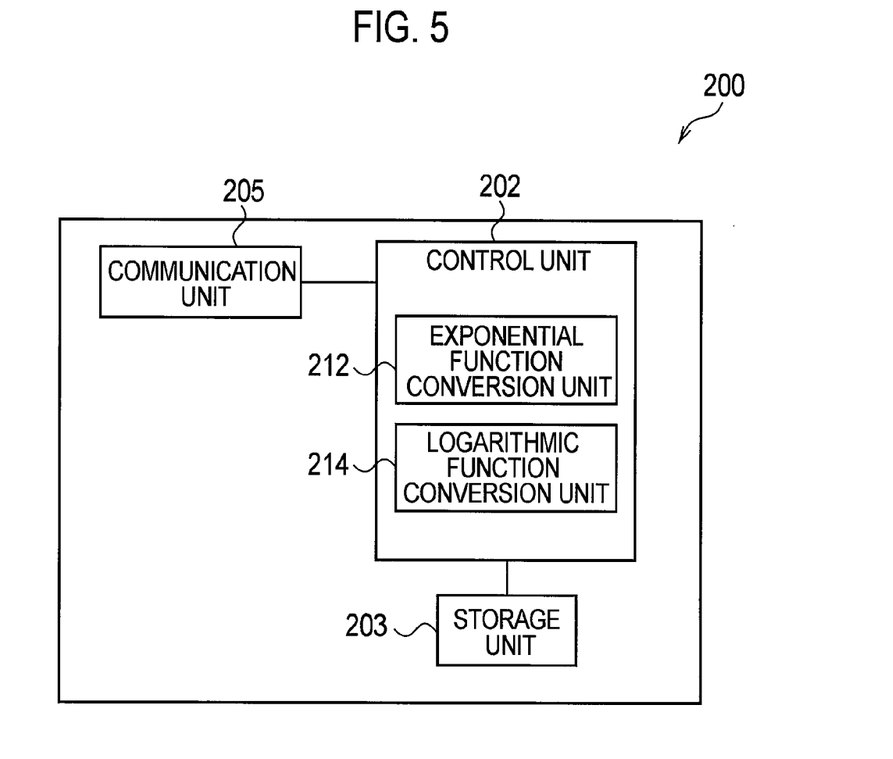
FIG. 5 is a diagram illustrating the configuration of a threshold value calculation apparatus according to the embodiment of the present invention.

FIG. 5 is a diagram illustrating the configuration of the threshold value calculation apparatus 200. The threshold value calculation apparatus 200 illustrated in FIG. 5 includes a control unit 202, a storage unit 203, and a communication unit 205.

The control unit 202 is configured, for example, by a CPU, and controls each function provided in the radio base station 1. The storage unit 203 is configured, for example, by a memory, and stores various types of information used in control for the like in the threshold value calculation apparatus 200. The communication unit 205 is connected to the radio base station 1.

The control unit 202 includes an exponential function conversion unit 212 and a logarithmic function conversion unit 214. The exponential function conversion unit 212 and the logarithmic function conversion unit 214 produce the corrected MCS threshold value table based on the various tables stored in the storage unit 203.

Figure 6:
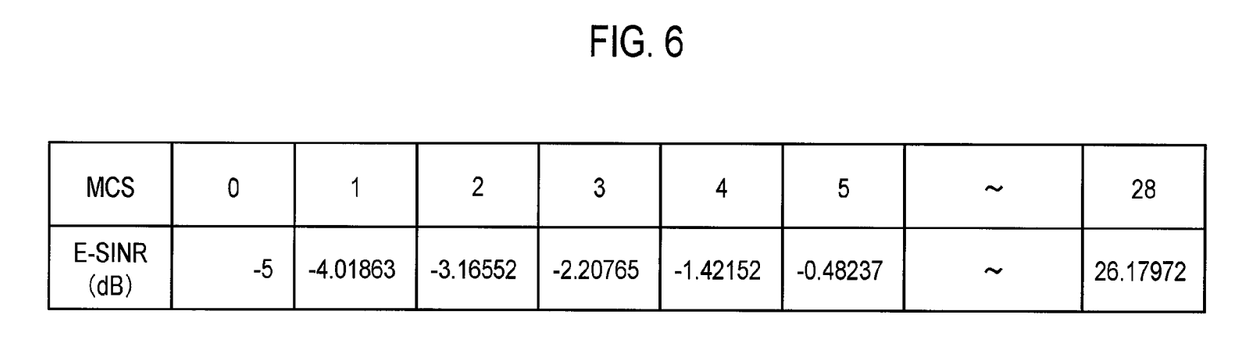
FIG. 6 is a diagram illustrating an example of an MCS threshold value table indicating a correspondence relationship between MCS and a threshold value of E-SINR, according to the embodiment of the present invention.
Figure 7:
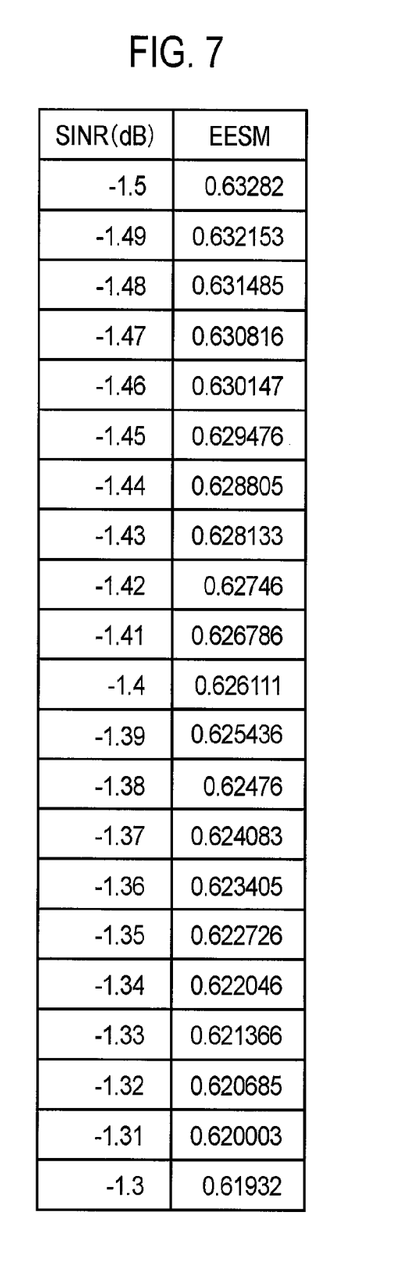
FIG. 7 is a diagram illustrating an example of a first conversion table indicating a correspondence relationship between SINR and EESM, according to the embodiment of the present invention.
Figure 8:
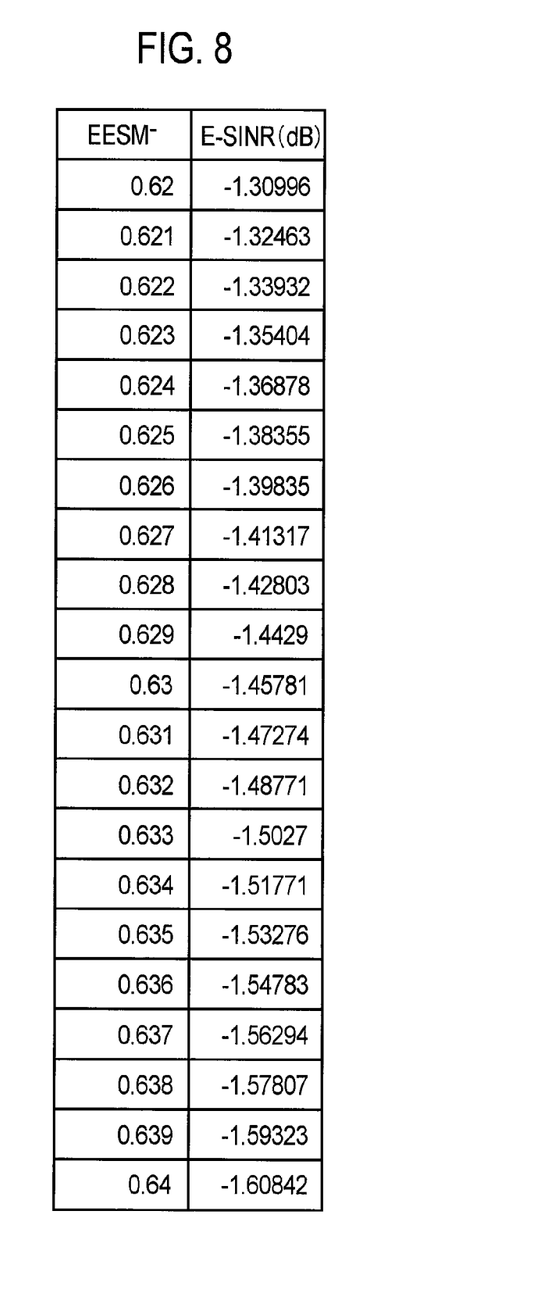
FIG. 8 is a diagram illustrating an example of a second conversion table indicating a correspondence relationship between EESM$^-$ and E-SINR, according to the embodiment of the present invention.

Specifically, the storage unit 203 stores an MCS threshold value table illustrated in FIG. 6, a first conversion table illustrated in FIG. 7, and a second conversion table illustrated in FIG. 8.

The MCS threshold value table illustrated in FIG. 6 shows the correspondence relationship between the MCS and the ideal E-SINR threshold value that is the ideal value for the lower limit of the E-SINR that satisfies the condition that FER is 10%. The first conversion table illustrated in FIG. 7 shows the correspondence relationship in an EESM scheme between SINR and EESM obtained by conversion of SINR using the exponential function (Equation 1) EESM=Exp ($-$SINR/$\beta$). The second conversion table illustrated in FIG. 8 shows the correspondence relationship in an EESM scheme between EESM$^-$, that is the average value of EESM, and E-SINR obtained by conversion of EESM$^-$ using a logarithmic function (Equation 2) E-SINR=$-\beta$*log(EESM$^-$) that is an inverse operation of the above exponential function (Equation 1). In FIG. 7 and FIG. 8, $\beta$ takes the value of 1.54719.

The exponential function conversion unit 212 acquires an ideal E-SINR threshold value corresponding to each MCS based on the MCS threshold value table illustrated in FIG. 6. For example, the exponential function conversion unit 212 acquires $-1.42152$ as the ideal E-SINR threshold value corresponding to MCS4.

Next, the exponential function conversion unit 212 acquires the EESM corresponding to each SINR based on the first conversion table illustrated in FIG. 7 by use of each ideal E-SINR threshold value as SINR. For example, the exponential function conversion unit 212 acquires 0.628133 that is the EESM corresponding to an SINR of greater than or equal to $-1.43$ and less than $-1.42$ in FIG. 7 as the EESM that corresponds to the ideal E-SINR threshold value of $-1.42152$.

The logarithmic function conversion unit 214 acquires the E-SINR corresponding to each EESM$^-$ based on the second conversion table illustrated in FIG. 8 using each EESM acquired by the exponential function conversion unit 212 as EESM$^-$. For example, the exponential function conversion unit 212 acquires $-1.42803$ that is the E-SINR corresponding to an EESM$^-$ of greater than or equal to 0.628 and less than 0.629 in FIG. 8 as the E-SINR that corresponds to an EESM of 0.628133.

Figure 9:
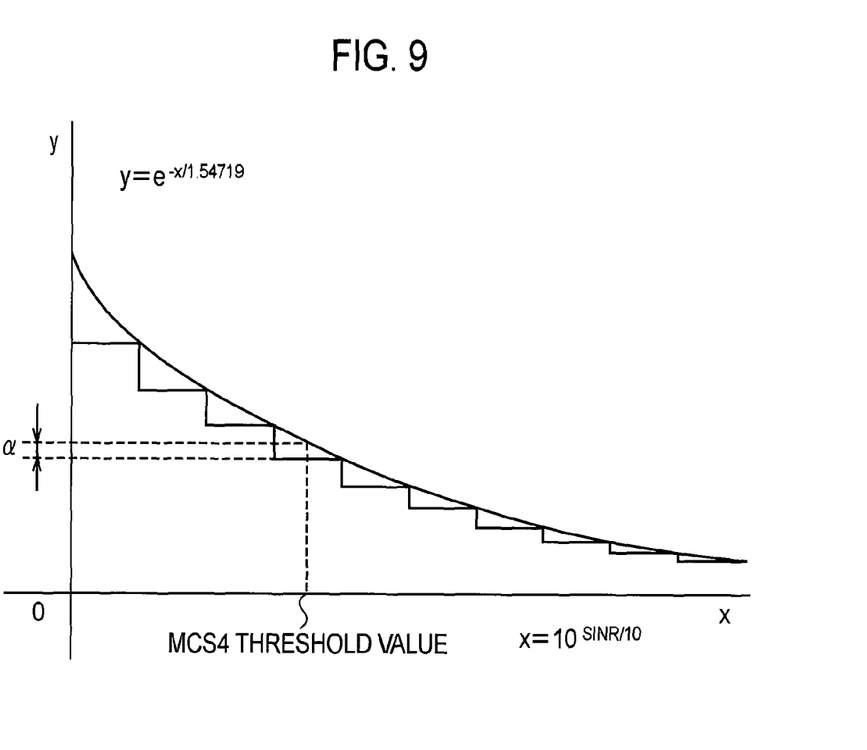
FIG. 9 is a diagram illustrating the error margin caused when using the first conversion table according to the embodiment of the present invention.

The E-SINR acquired by the logarithmic function conversion unit 214 does not correspond with the ideal E-SINR threshold value. Since the values in the first conversion table are discrete values, a difference $\alpha$ from the value in a continuous function is produced as illustrated in FIG. 9. Further since the values in the second conversion table are discrete values, a difference from the value in a continuous function is produced in the same manner. Therefore precision is adversely affected.

The MCS determination unit 164 for the radio base station 1 as described above acquires an E-SINR from a plurality of SINR using the first conversion table and the second conversion table. Therefore, the MCS precision is also adversely affected by the reduction in the precision of E-SINR when the MCS determination unit 164 determines MCS based on the E-SINR acquired using the first conversion table and the second conversion table and the MCS threshold value table illustrated in FIG. 6.

Figure 10:
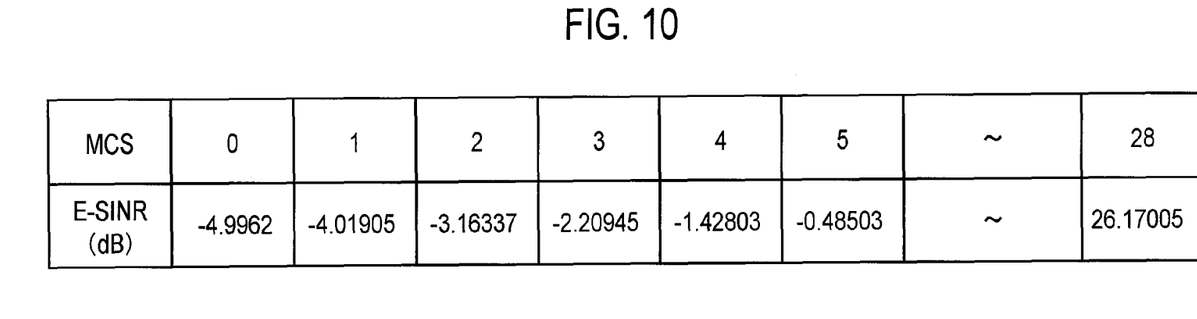
FIG. 10 is a diagram illustrating an example of a corrected MCS threshold value table indicating a correspondence relationship between MCS and a corrected threshold value of E-SINR, according to the embodiment of the present invention.

To solve this, the threshold value calculation apparatus 200 corrects each ideal E-SINR threshold value within the MCS threshold value table, according to the deteriorate precision of E-SINR. Specifically, the logarithmic function conversion unit 214 replaces each ideal E-SINR threshold value within the MCS threshold value table with each E-SINR (corrected E-SINR threshold value) acquired by using the first conversion table and the second conversion table so as to produce the corrected MCS threshold value table. For example, the logarithmic function conversion unit 214 replaces the ideal E-SINR threshold value $-1.42152$ with $-1.42803$ that is the E-SINR acquired by using the first conversion table and the second conversion table. FIG. 10 is a diagram illustrating one example of the corrected MCS threshold value table.

The corrected MCS threshold value table is held in the storage unit 203. Further, the corrected MCS threshold value table is transmitted to the radio base station 1 via the communication unit 205 at a predetermined timing, and stored in the storage unit 103 within the radio base station 1.

The description will now return to FIG. 4. The MCS determination unit 164 selects a plurality of subbands to be assigned and a radio terminal for assignment of the subbands based on the terminal ID and the plurality of assignment positions from the assignment determination unit 163.

Then, the MCS determination unit 164 acquires the S-CQI containing the terminal ID corresponding to the radio terminal containing the assignment address from the S-CQIs provided by the signal processing unit 152 for use as S-CQI corresponding to the plurality of subbands to be assigned. Then the MCS determination unit 164 converts the acquired plurality of S-CQIs to respective SINRs. For example, a table indicating a correspondence relationship between S-CQI and SINR is stored in the storage unit 103, and the MCS determination unit 164 can convert the acquired plurality of S-CQIs to respective SINRs based on the table.

Next, the MCS determination unit 164 converts the plurality of SINRs acquired by conversion into EESMs using the first conversion table stored in the storage unit 103. Then, the MCS determination unit 164 calculates EESM$^-$ that is the average value of each EESM. The MCS determination unit 164 converts the EESM$^-$ to E-SINR using the second conversion table stored in the storage unit 103.

Next, the MCS determination unit 164 uses the corrected MCS threshold value table stored in the storage unit 103 to determine the MCS corresponding to the E-SINR obtained by conversion, that is to say, the MCS of the subband assigned to the radio terminal. For example, when E-SINR is $-1.42803$, if the MCS threshold value table illustrated in FIG. 6 is used in the conventional process, then the MCS takes a value of 3 and therefore precision is adversely affected. On the other hand, in this embodiment, the corrected MCS threshold value table illustrated in FIG. 10 is used to obtain MCS of 4, and thereby, it is possible to improve the precision.

Next, the MCS determination unit 164 transmits the assignment information including the determined MCS and the plurality of assignment positions via the signal processing unit 152, the radio communication unit 105, and the antenna 107 to the transmission address of the radio terminal determined by the terminal ID obtained from the assignment determination unit 163.

(2) Operation of Radio Base Station

Figure 11:
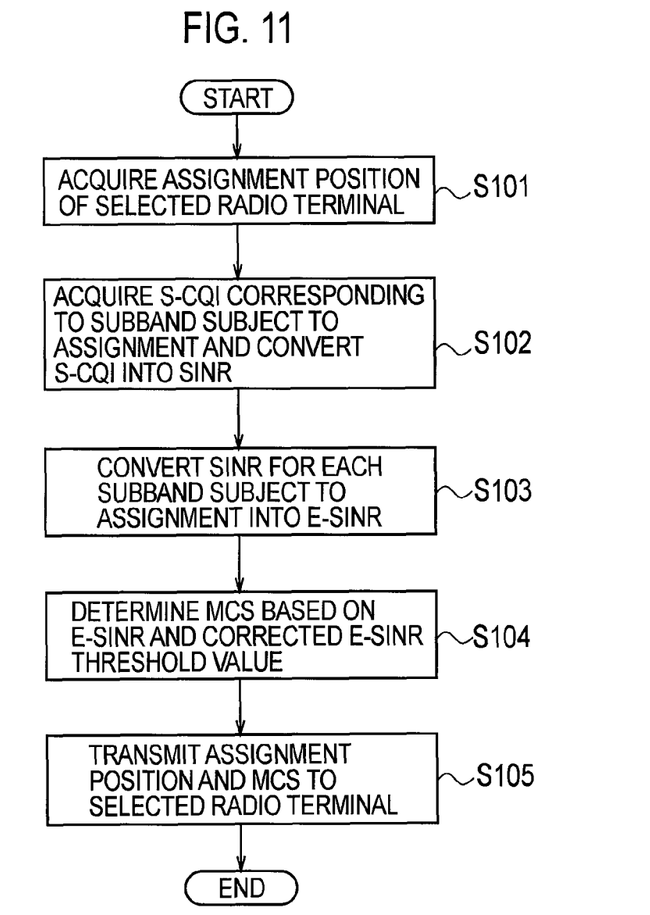
FIG. 11 is a flowchart illustrating the operation of a radio base station according to the embodiment of the present invention.

FIG. 11 is a flowchart showing the operation of the radio base station 1, specifically, the operation of an MCS determination unit 164.

In step S101, the MCS determination unit 164 acquires a plurality of assignment positions determined by the assignment determination unit 163 in relation to radio terminals selected by the terminal selection unit 162.

In step S102, the MCS determination unit 164 acquires the S-CQI corresponding to the plurality of subbands for assignment from the S-CQIs received from the signal processing unit 152. Further, the MCS determination unit 164 converts the acquired plurality of S-CQIs respectively to SINRs.

In step S103, the MCS determination unit 164 converts the SINR for each of the plurality of subbands to be assigned that are obtained by conversion into E-SINRs using the first conversion table and the second conversion table.

In step S104, the MCS determination unit 164 determines the MCS based on the E-SINR obtained by conversion and the corrected E-SINR threshold value in the corrected MCS threshold value table.

In step S105, the MCS determination unit 164 transmits the determined MCS and the plurality of assignment positions to the radio terminal selected by the terminal selection unit 162.

(3) Operation and Effect

The radio base station 1 in a radio communication system 10 according to the present embodiment acquires an E-SINR from the plurality of SINRs using the first conversion table or the second conversion table. As a result, when the radio base station 1 determines the MCS based on the MCS threshold value table shown in FIG. 6 and the E-SINR, the MCS precision is reduced as a result of the reduction in the E-SINR precision.

To prevent this type of reduction in precision, the threshold value calculation apparatus 200 corrects each ideal E-SINR threshold value within the MCS threshold value table in response to the reduction in the precision of E-SINR to thereby produce a corrected MCS threshold value table. Further, when acquiring E-SINR from a plurality of SINRs by using the first conversion table and the second conversion table, the radio base station 1 determines the MCS corresponding to the E-SINR, in other words, the MCS of the subband assigned to the radio terminal base on the corrected MCS threshold value table. Therefore, the processing amount in the radio base station 1 can be reduced by use of the first conversion table and the second conversion table to thereby eliminate degradation in precision and enable determination of a suitable MCS.

(4) Other Embodiments

Although the present invention has been described in relation to the embodiments above, the description or drawings forming a part of this disclosure should not be understood as imposing a restriction on the invention. Further, various substitutions, examples or operational techniques shall be apparent to a person skilled in the art based on this disclosure.

For example, although the threshold value calculation apparatus 200 in the above embodiment is provided separately to the radio base station 1, threshold value calculation apparatus may be provided in the radio base station 1.

Further, in the above embodiment, the first conversion table in the above embodiment exhibits a correspondence relationship in an EEMS method between SINR and EESM obtained by conversion of SINR using an exponential function (Equation 1) $EESM = Exp(-SINR/\beta)$, and the second conversion table exhibits a correspondence relationship in an EESM scheme between $EESM^-$, that is the average value for EESM, and E-SINR obtained by conversion of $EESM^-$ using a logarithmic function (Equation 2) $E\text{-}SINR = -\beta * \log(EESM^-)$ that is an inverse operation of the above exponential function (Equation 1). However, the first conversion table may exhibit a correspondence relationship between SINR and a value obtained by conversion using a predetermined logarithmic function, and the second conversion table may exhibit a correspondence relationship between that value and E-SINR obtained by conversion using a predetermined exponential function that is an inverse operation of the predetermined logarithmic function described above.

In this case, the logarithmic function conversion unit 214 in the threshold value calculation apparatus 200 acquires a predetermined value corresponding to each SINR based on the first conversion table using each ideal E-SINR threshold value as SINR. Next, the logarithmic function conversion unit 214 acquires the E-SINR corresponding to each predetermined value based on the second conversion table. Further, the logarithmic function conversion unit 214 replaces each ideal E-SINR threshold value within the MCS threshold value table with each E-SINR (corrected E-SINR threshold value) acquired by using the first conversion table and the second conversion table so as to produce the corrected MCS threshold value table.

The MCS determination unit 164 of the radio base station 1 acquires a predetermined value corresponding to each SINR based on the first conversion table, and acquires E-SINR corresponding to each predetermined value based on the second conversion table. Further, the MCS determination unit 164 determines the MCS corresponding to the acquired E-SINR, in other words, the MCS of the subband assigned to the radio terminal, based on the corrected MCS threshold value table.

In the embodiments described above, although assignment of subbands to a radio terminal is described as a downlink radio resource in the LTE radio communication system 10, the present invention may be applied in the same manner to assignment of an uplink radio resource, or assignment of a radio resource in a radio communication system other than the LTE system.

The present invention should be understood to encompass various embodiments that are not stated herein. Therefore, the present invention is limited only by the specific features of the invention in the scope of the patent claims reasonably evident from the disclosure above.

It is noted that the entire contents of Japanese Patent Application No. 2009-151655 (filed on Jun. 25, 2009) are hereby incorporated in the present specification by reference.

Industrial Applicability

The threshold value calculation method and the radio base station according to the present invention enable a reduction in the processing amount on the radio base station, and enable determination of a suitable MCS in response to communication quality and are thereby effective as a method of calculating a threshold value and as a radio base station.

The invention claimed is:

1. A threshold value calculation method in a threshold calculation apparatus configured to calculate a threshold value of a communication quality used when determining MCS (Modulation and Coding Scheme) corresponding to a communication quality of a radio resource in a radio base station, comprising:
- a step A converting, by the calculation apparatus, a first threshold value that is an ideal value into a first calculation value by using a first table indicating a correspondence relationship between a first value indicating a communication quality and a second value obtained by a calculation using a first function for the first value; and
- a step B of converting, by the calculation apparatus, the first calculation value into a corrected threshold value by using a second table indicating a correspondence relationship between a third value indicating a communication quality and a fourth value obtained by an arithmetic operation using a second function that is an inverse operation of the calculation using the first function in relation to the third value, wherein
the corrected threshold value is used as the threshold value of the communication quality when the MCS is determined by use of the first table and the second table.

2. The threshold value calculation method according to claim 1, comprising:
- a step C of: holding, by the calculation apparatus, a corrected table indicating a correspondence relationship between the MCS and the corrected threshold value.

3. The threshold value calculation method according to claim 1, wherein
the first function is an exponential function, and
the second function is a logarithmic function.

4. A radio base station configured to determine MCS (Modulation and Coding Scheme) corresponding to a communication quality of a radio resource, comprising:
- a processor coupled to a non-transient computer-readable storage medium containing instructions that, when operated upon, causes the processor to:
- convert a first threshold value that is an ideal value of a threshold value of the communication quality used when determining MCS corresponding to a communication quality of the radio resource into the first calculation value, by using a first table indicating a correspondence relationship between a first value indicating a communication quality and a second value obtained by a calculation using a first function for the first value; and
- convert the first calculation value into a corrected threshold value by using a second table indicating a correspondence relationship between a third value indicating a communication quality and a fourth value obtained by a calculation using a second function that is an inverse operation of the calculation using the first function for the third value, wherein
the corrected threshold value is used as the threshold value of the communication quality when the MCS is determined by use of the first table and the second table.

5. The radio base station according to claim 4, comprising:
a holding unit configured to hold a corrected table indicating a correspondence relationship between the communication quality and the corrected threshold value.

* * * * *